T. GIBSON.
Fruit Jar.
No. 80,472.
Patented July 28, 1868.
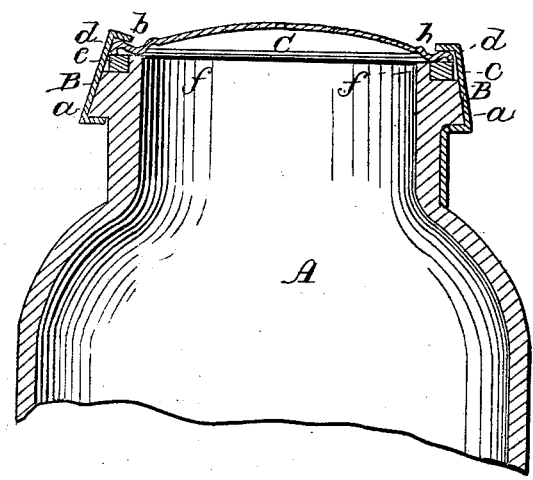
Witnesses:
Geo A Gage
Jo L Gage
Inventor:
Thomas Gibson

United States Patent Office.

THOMAS GIBSON, OF ROCHESTER, NEW YORK.

Letters Patent No. 80,472, dated July 28, 1868.

IMPROVED FRUIT-JAR.

The Schedule referred to in these Letters Patent and making part of the same.

TO ALL WHOM IT MAY CONCERN:

Be it known that I, THOMAS GIBSON, of the city of Rochester, in the State of New York, have invented a new and useful Fruit-Jar; and I do hereby declare that the following is a full, clear, and exact description thereof, reference being had to the accompanying drawing, making part of this specification, in which—

Figure 1 is a vertical section.

The nature of my invention will be understood from the drawing and specification.

To enable others skilled in the art to make and use my invention, I will describe its construction and operation.

The neck of my jar, A, is provided with a flange, $a$. The bottom of the flange $a$ may be either at right angles to the neck of the jar or at a slightly acute angle to prevent the clamps B from slipping. It also extends around the neck of the jar, and is slightly conical in shape, so that the clamp will easily reach the cover. The top of the neck, $f$, of the jar extends sufficiently above the flange $a$ to receive an annular packing, $c$. The cover, C, is cut from sheet metal by a die or otherwise, and the edge is turned down, as shown at $d$. A crease, $b$, is formed in the upper side to receive the upper end of the clamp B when it is applied. The clamps B are made from thin sheet metal, and are formed in the shape shown in the drawing.

The object of my invention is to make a cover to fruit-jars, that may be easily adjusted, and at the same time manufactured cheaply; the great variety in the market making this a particular point to be obtained.

Its operation is as follows: The jar is filled with hot fruit and sirup to the top, the packing-ring $c$ is placed on the projection of the jar-neck above the flange $a$. The cover C is then applied, the vertical edge resting on the packing. Two or more clamps B are then so applied that the hook on one end is below the flange, and the other rests on the cover in the crease $b$, thus holding the cover firmly, and forming an air-tight joint.

What I claim as my invention, and desire to secure by Letters Patent, is—

The cover C, with its groove $b$, and the detachable clamps B, in combination with the flange $a$ and packing-ring $c$, all acting conjointly, as herein shown and for the purpose described.

THOMAS GIBSON.

Witnesses:
  JAS. L. GAGE,
  GEO. A. GAGE.